(12) United States Patent
Dollinger et al.

(10) Patent No.: US 9,462,748 B2
(45) Date of Patent: Oct. 11, 2016

(54) SYSTEM AND METHOD FOR CALIBRATING ALIGNMENT OF AGRICULTURAL VEHICLES

(71) Applicant: CNH Industrial America LLC, New Holland, PA (US)

(72) Inventors: Tyson J. Dollinger, Channahon, IL (US); Brian R. Ray, Chicago, IL (US); Adam R. Rusciolelli, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/738,367

(22) Filed: Jun. 12, 2015

(65) Prior Publication Data
US 2015/0366134 A1 Dec. 24, 2015

Related U.S. Application Data

(60) Provisional application No. 62/012,028, filed on Jun. 13, 2014.

(51) Int. Cl.
*G06F 19/00* (2011.01)
*E02F 5/08* (2006.01)
(Continued)

(52) U.S. Cl.
CPC ........... *A01D 41/127* (2013.01); *A01D 43/087* (2013.01); *A01D 90/10* (2013.01); *B65G 67/24* (2013.01); *G05B 15/02* (2013.01); *B65G 2201/04* (2013.01)

(58) Field of Classification Search
CPC ...... A01D 46/08; A01D 61/00; A01D 82/00; A01D 87/02; A01D 91/00; A01F 15/07; A01F 15/0705; A01F 15/10; A01F 15/106; A01F 17/02; A23N 5/00; G01G 11/00; Y10T 83/0222; Y10T 83/0289; Y10T 83/0378

USPC .......... 701/50, 69, 71, 72; 180/900, 180/89.11–90.6; 37/95, 93, 348–380
See application file for complete search history.

(56) References Cited

U.S. PATENT DOCUMENTS 5,575,316 A 11/1996 Pollklas
6,073,070 A 6/2000 Diekhans
(Continued)

FOREIGN PATENT DOCUMENTS

EP 1344445 A1 9/2003
EP 2044826 A2 4/2009
(Continued)

OTHER PUBLICATIONS

EP Extended Search Report dated Oct. 14, 2015.
(Continued)

*Primary Examiner* — Muhammad Shafi
(74) *Attorney, Agent, or Firm* — Rebecca L. Henkel

(57) ABSTRACT

A control system for an agricultural vehicle includes a controller configured to calibrate alignment of a conveyor outlet of the agricultural vehicle with a storage compartment by receiving a first signal from a user interface indicative of alignment of the conveyor outlet with a first desired point on the storage compartment, determining a first position of the storage compartment relative to the agricultural vehicle upon receiving the first signal, receiving a second signal from the user interface indicative of alignment of the conveyor outlet with a second desired point on the storage compartment, diagonally opposite the first desired point, determining a second position of the storage compartment relative to the agricultural vehicle upon receiving the second signal, and establishing a bounding rectangle having a first corner at the first desired point and a second corner at the second desired point based on the first position and the second position.

15 Claims, 8 Drawing Sheets

(51) Int. Cl.
   *A01D 41/127* (2006.01)
   *A01D 90/10* (2006.01)
   *B65G 67/24* (2006.01)
   *G05B 15/02* (2006.01)
   *A01D 43/08* (2006.01)

(56) References Cited

U.S. PATENT DOCUMENTS

| | | | |
|---|---|---|---|
| 6,097,425 A | 8/2000 | Behnke et al. | |
| D476,340 S | 6/2003 | Niebuhr et al. | |
| 6,587,772 B2 | 7/2003 | Behnke | |
| 6,682,416 B2 | 1/2004 | Behnke et al. | |
| 6,747,510 B2 | 6/2004 | Jantzi et al. | |
| 6,907,336 B2 | 6/2005 | Gray et al. | |
| 6,934,615 B2 | 8/2005 | Flann et al. | |
| 6,968,264 B2 | 11/2005 | Cripps | |
| 7,010,425 B2 | 3/2006 | Gray et al. | |
| 7,054,731 B1 | 5/2006 | Lange et al. | |
| 7,079,943 B2 | 7/2006 | Flann et al. | |
| 7,110,881 B2 | 9/2006 | Gray et al. | |
| 7,114,318 B2 | 10/2006 | Poulson et al. | |
| 7,117,072 B2 | 10/2006 | Gehring et al. | |
| 7,121,073 B2 | 10/2006 | Schmidt et al. | |
| 7,216,033 B2 | 5/2007 | Flann et al. | |
| 7,228,214 B2 | 6/2007 | Flann et al. | |
| 7,231,757 B2 | 6/2007 | Poulson et al. | |
| 7,377,092 B2 | 5/2008 | Schmidt et al. | |
| 7,480,564 B2 | 1/2009 | Metzler et al. | |
| 7,537,519 B2 | 5/2009 | Huster et al. | |
| 7,721,516 B2 | 5/2010 | Wendling | |
| 7,751,390 B2 | 7/2010 | Mosko et al. | |
| 7,957,850 B2 | 6/2011 | Anderson | |
| 8,060,283 B2 | 11/2011 | Mott et al. | |
| 8,126,620 B2 | 2/2012 | Ringwald et al. | |
| 8,145,393 B2 | 3/2012 | Foster et al. | |
| 8,160,765 B2 | 4/2012 | Morselli et al. | |
| 8,180,534 B2 | 5/2012 | Burke et al. | |
| 8,182,190 B2 | 5/2012 | Ash | |
| 8,229,618 B2 | 7/2012 | Tolstedt et al. | |
| 8,280,595 B2 | 10/2012 | Foster et al. | |
| 8,285,456 B2 | 10/2012 | Jensen | |
| 8,352,112 B2 | 1/2013 | Mudalige | |
| 8,649,940 B2 | 2/2014 | Bonefas | |
| 2008/0245042 A1 | 10/2008 | Brunnert et al. | |
| 2009/0306835 A1 | 12/2009 | Ellermann et al. | |
| 2010/0332051 A1 | 12/2010 | Kormann | |
| 2011/0022273 A1 | 1/2011 | Peters et al. | |
| 2011/0054729 A1* | 3/2011 | Whitehead | A01B 69/007 701/31.4 |
| 2012/0029732 A1 | 2/2012 | Meyer | |
| 2012/0215381 A1 | 8/2012 | Wang et al. | |
| 2012/0215394 A1 | 8/2012 | Wang et al. | |
| 2012/0215410 A1* | 8/2012 | McClure | A01B 79/005 701/50 |
| 2012/0265412 A1 | 10/2012 | Diekhans et al. | |
| 2012/0302299 A1 | 11/2012 | Behnke et al. | |
| 2013/0019580 A1 | 1/2013 | Anderson et al. | |
| 2013/0045067 A1 | 2/2013 | Pickett et al. | |
| 2013/0166157 A1 | 6/2013 | Schleicher et al. | |
| 2014/0324291 A1* | 10/2014 | Jones | E02F 9/2045 701/41 |

FOREIGN PATENT DOCUMENTS

| | | |
|---|---|---|
| WO | 2012110508 | 8/2012 |
| WO | 2012112205 | 8/2012 |
| WO | 2013120079 A1 | 8/2013 |

OTHER PUBLICATIONS

EP Application No. 15 17 1800.4 Extended Search Report dated Oct. 27, 2015.
Shearer et al., "Trends in the Automation of Agricultural Field Machinery," pp. 1-21.
U.S. Appl. No. 14/738,495, filed Jun. 12, 2015, Tyson J. Dollinger.

* cited by examiner

SYSTEM AND METHOD FOR CALIBRATING ALIGNMENT OF AGRICULTURAL VEHICLES

CROSS REFERENCE TO RELATED APPLICATION

This application claims priority from and the benefit of U.S. Provisional Application Ser. No. 62/012,028, entitled "SYSTEM AND METHOD FOR CALIBRATING ALIGNMENT OF AGRICULTURAL VEHICLES", filed Jun. 13, 2014, which is hereby incorporated by reference in its entirety.

BACKGROUND

The invention relates generally to a system and method for calibrating alignment of agricultural vehicles.

A harvester may be used to harvest agricultural crops, such as cotton, wheat, flax, or other crops. Generally, components (e.g., drums, spindles, blades, etc.) of the harvester remove portions of the agricultural crops from the ground. The harvester then conveys the removed portions of the agricultural crops (e.g., agricultural products) to an internal storage compartment, either directly or via a processing device configured to remove undesirable portions of the agricultural products.

As the harvester traverses a field, the volume of the agricultural product stored within the internal storage compartment increases. Accordingly, the internal storage compartment is typically unloaded multiple times during the harvesting process. One method of unloading the internal storage compartment, generally know as unloading on-the-go, involves periodically transferring the agricultural product to a mobile storage compartment while the harvester is in motion. The mobile storage compartment is towed by a haul vehicle to a position proximate to the harvester. The operator of the haul vehicle aligns the storage compartment with a conveyor outlet of the harvester and substantially matches the speed of the harvester. The harvester operator then initiates transfer of the agricultural product from the harvester to the mobile storage compartment, thereby unloading the internal storage compartment of the harvester. Once the harvester is unload, the haul vehicle operator directs the mobile storage compartment to a remote location for offloading. This process repeats throughout the harvesting process.

Highly skilled drivers typically operate the haul vehicles due to the complexity associated with aligning the mobile storage compartment with the harvester and matching the speed of the harvester. Employing such drivers may increase the costs associated with the harvesting process and/or may delay the harvesting process due to the limited availability of these drivers. Furthermore, employing less skilled drivers to operate the haul vehicles may result in agricultural product loss due to misalignment of the mobile storage compartment with the harvester and/or mismatched operating speeds. As a result, the efficiency of the harvesting process may be reduced.

BRIEF DESCRIPTION

In one embodiment, a control system for an agricultural vehicle includes a controller configured to calibrate alignment of a conveyor outlet of the agricultural vehicle with a storage compartment by receiving a first signal from a user interface indicative of alignment of the conveyor outlet with a first desired point on the storage compartment, determining a first position of the storage compartment relative to the agricultural vehicle upon receiving the first signal, receiving a second signal from the user interface indicative of alignment of the conveyor outlet with a second desired point on the storage compartment, diagonally opposite the first desired point, determining a second position of the storage compartment relative to the agricultural vehicle upon receiving the second signal, establishing a bounding rectangle having a first corner at the first desired point and a second corner at the second desired point based on the first position and the second position, establishing a target point within the bounding rectangle, and outputting a third signal indicative of a third position of the first corner of the bounding rectangle relative to the storage compartment, a fourth position of the second corner of the bounding rectangle relative to the storage compartment, and a fifth position of the target point relative to the storage compartment.

In another embodiment, a control system for an agricultural vehicle includes a user interface configured to receive input from an operator of the agricultural vehicle. The control system also includes a controller communicatively coupled to the user interface. The controller is configured to calibrate alignment of a conveyor outlet of the agricultural vehicle with a storage compartment by receiving a first signal from the user interface indicative of alignment of the conveyor outlet with a first desired point on the storage compartment, determining a first position of the storage compartment relative to the agricultural vehicle upon receiving the first signal, receiving a second signal from the user interface indicative of alignment of the conveyor outlet with a second desired point on the storage compartment, diagonally opposite the first desired point, determining a second position of the storage compartment relative to the agricultural vehicle upon receiving the second signal, establishing a bounding rectangle having a first corner at the first desired point and a second corner at the second desired point based on the first position and the second position, and establishing a target point within the bounding rectangle.

In a further embodiment, a method for calibrating alignment of a conveyor outlet of an agricultural vehicle with a storage compartment includes receiving a first signal from a user interface indicative of alignment of the conveyor outlet with a first desired point on the storage compartment, and determining a first position of the storage compartment relative to the agricultural vehicle upon receiving the first signal. The method also includes receiving a second signal from the user interface indicative of alignment of the conveyor outlet with a second desired point on the storage compartment, diagonally opposite the first desired point, and determining a second position of the storage compartment relative to the agricultural vehicle upon receiving the second signal. In addition, the method includes establishing a bounding rectangle having a first corner at the first desired point and a second corner at the second desired point based on the first position and the second position, and establishing a target point within the bounding rectangle. The method also includes outputting a third signal indicative of a third position of the first corner of the bounding rectangle relative to the storage compartment, a fourth position of the second corner of the bounding rectangle relative to the storage compartment, and a fifth position of the target point relative to the storage compartment.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
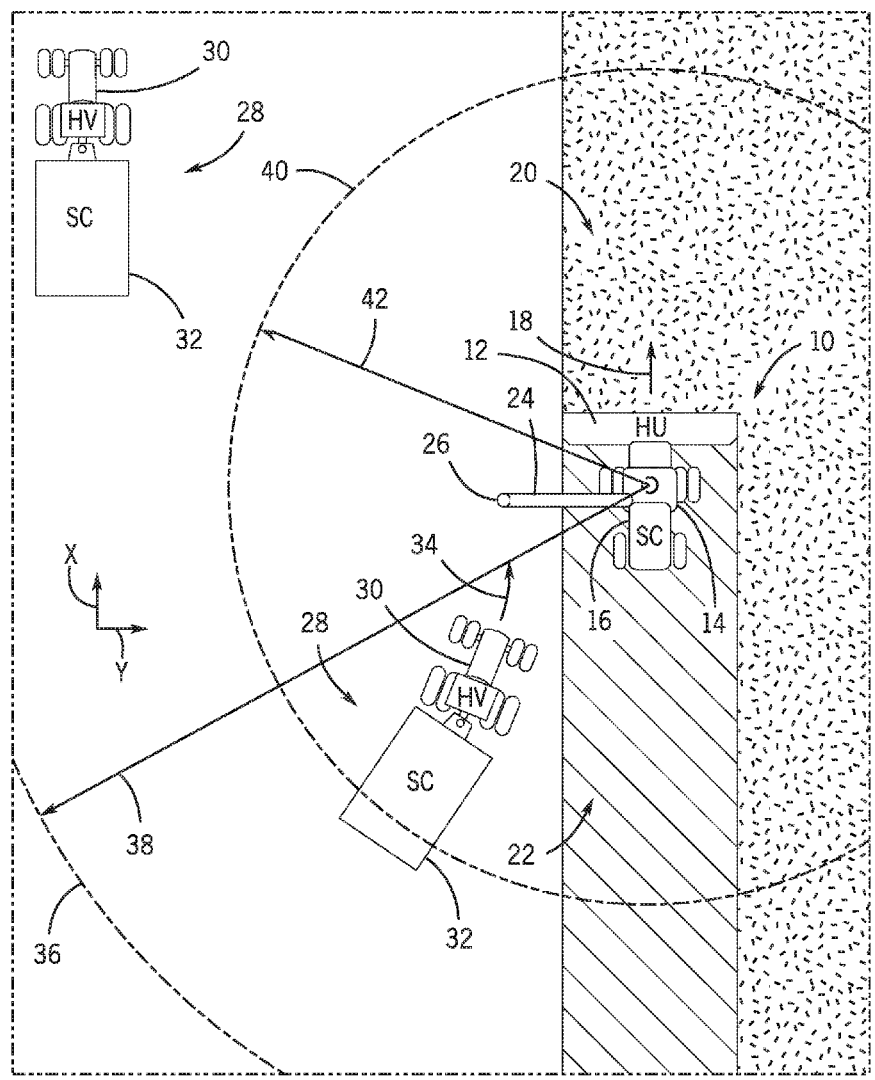
FIG. 1 is a top view of an embodiment of an agricultural harvester and an agricultural product transportation system, in which the agricultural product transportation system is configured to automatically dock with the agricultural harvester.

FIG. 1 is a top view of an embodiment of an agricultural harvester and an agricultural product transportation system, in which the agricultural product transportation system is configured to automatically dock with the agricultural harvester. In the illustrated embodiment, the agricultural harvester 10 includes a row of harvesting units 12, labeled HU, positioned on a front end of a chassis 14 and an internal storage compartment 16, labeled SC, coupled to the chassis 14. As the agricultural harvester 10 traverses a field in a direction of travel 18 (e.g., along a longitudinal axis X), the harvesting units 12 engage unharvested plants 20 and extract various agricultural products (e.g., corn, wheat, cotton, etc.) from the plants. These agricultural products are transferred to the internal storage compartment 16, either directly or via a processing device configured to remove undesirable portions of the agricultural products. The remaining portions of the plants remain in the field as agricultural residue 22.

As the harvester 10 traverses the field, the volume of the agricultural product stored within the internal storage compartment 16 increases. Accordingly, the harvester 10 includes a conveyor 24 configured to transfer the agricultural product to a mobile storage compartment while the harvester is in motion. The conveyor 24 may include an auger, a conveyor belt, or other suitable device configured to transfer the agricultural product from the internal storage compartment 16 to an outlet 26. As discussed in detail below, the mobile storage compartment may be automatically aligned with the conveyor outlet 26, thereby enhancing the efficiency of the harvester unloading process. While the illustrated agricultural harvester 10 is a self-propelled vehicle, it should be appreciated that, in certain embodiments, the agricultural harvester may be towed behind a tractor or other work vehicle. In addition, while the illustrated agricultural harvester 10 includes an internal storage compartment 16, it should be appreciated that the internal storage compartment may be omitted in certain harvester configurations. In such configurations, the harvester may continuously transfer agricultural product to the mobile storage compartment as the harvester extracts and processes the agricultural products.

In the illustrated embodiment, an agricultural product transportation system 28 is configured to receive the agricultural product from the harvester 10. As illustrated, the product transportation system 28 includes a haul vehicle 30, labeled HV, such as the illustrated tractor, and a mobile storage compartment 32 (e.g., grain cart), labeled SC. As discussed in detail below, the haul vehicle 30 includes a controller configured to automatically direct the storage compartment along a route 34 to a target position adjacent to the harvester 10. That is, the controller may automatically control the haul vehicle 10 during a docking process, thereby positioning the storage compartment in a location (e.g., along the longitudinal axis X and along a lateral axis Y) that enhances the transfer efficiency of the agricultural product from the harvester to the storage compartment. In certain embodiments, the controller is configured to determine a target position and a target velocity of the haul vehicle based at least in part on a determined position and a determined velocity of the harvester 10. The controller is also configured to instruct an automated steering control system and an automated speed control system to direct the haul vehicle toward the target position. Once the haul vehicle substantially reaches the target position, the controller is configured to instruct the automated steering control system and the automated speed control system to substantially maintain the target position and the target velocity.

In certain embodiments, the target position corresponds to a position that substantially aligns the conveyor outlet 26 with a target point on the storage compartment 32. Accordingly, with the haul vehicle located at the target position, the agricultural product may be transferred from the harvester 10 to the storage compartment 32 while the vehicles are in motion. Because the controller automatically maintains the position of the storage compartment relative to the conveyor outlet during the unloading process, the possibility of agricultural product loss is substantially reduced or eliminated, thereby increasing the efficiency of the harvesting process.

By way of example, when the haul vehicle 30 enters an area of communication 36, communication is automatically established between a first transceiver on the haul vehicle 30 and a second transceiver on the harvester 10. That is, the controller of the haul vehicle detects the harvester upon receiving a signal from the harvester transceiver, and the controller on the harvester detects the haul vehicle upon receiving a signal from the haul vehicle transceiver. As will be appreciated, a range 38 of the area of communication 36 may be dependent on the broadcast power of the transceivers, the sensitivity of the transceivers, and/or the communication frequency, among other factors. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). As discussed in detail below, the data may include a position of the vehicle, a velocity of the vehicle, a steering angle of the vehicle, an orientation of the vehicle, and/or an identity of the vehicle, among other parameters. In addition, each transceiver may be configured to retransmit data received from another transceiver. For example, the haul vehicle closer to the harvester may receive a signal from the harvester, and then retransmit the signal to the haul vehicle farther from the harvester, thereby effectively extending the communication range of each transceiver.

To initiate the docking process, an operator of the haul vehicle provides input to a user interface, thereby instructing the controller to enable automatic control of the haul vehicle.

If the haul vehicle is within an area of engagement 40 (i.e., a distance between the harvester and the haul vehicle is less than an engagement distance 42), the controller instructs the automated steering control system and the automated speed control system to direct the haul vehicle toward the target position. For example, if the harvester is positioned in front of the haul vehicle, the automated speed control system may increase the speed of the haul vehicle. Conversely, if the harvester is positioned behind the haul vehicle, the automated speed control system may stop the haul vehicle until the harvester reaches a docking position. In addition, the steering control system may adjust wheel angles, for example, to steer the haul vehicle toward the harvester. Once the haul vehicle substantially reaches the target position, the controller instructs the automated steering control system and the automated speed control system to substantially maintain the target position and the target velocity, thereby facilitating transfer of agricultural product from the harvester to the storage compartment.

Figure 2:
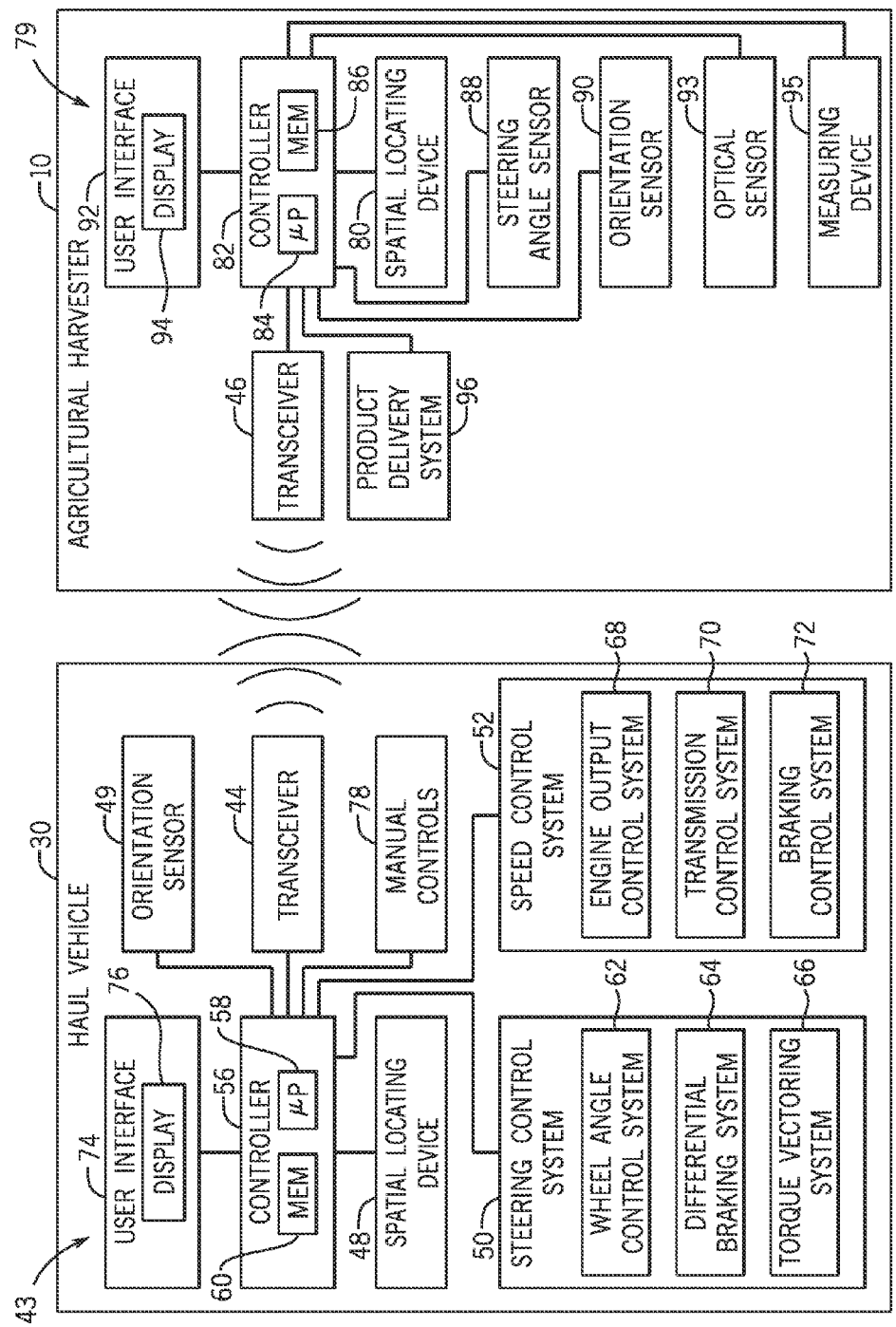
FIG. 2 is a schematic diagram of an embodiment of an agricultural harvester and a haul vehicle, which may be employed within the agricultural product transportation system of FIG. 1.

FIG. 2 is a schematic diagram of an embodiment of an agricultural harvester 10 and a haul vehicle 30, which may be employed within the agricultural product transportation system of FIG. 1. In the illustrated embodiment, the haul vehicle 30 includes a control system 43 having a first transceiver 44 configured to receive a first signal from a second transceiver 46 of a target vehicle, such as the illustrated agricultural harvester 10. As discussed in detail below, the first signal is indicative of a first determined position (e.g., three-dimensional position vector) and a first determined velocity (e.g., three-dimensional velocity vector) of the harvester 10. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation. As will be appreciated, the position vector may be represented in a rectangular, polar, cylindrical, or spherical coordinate system, among other suitable coordinate systems. In addition, as used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. Similar to the position vector, the velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The haul vehicle control system 43 also includes a spatial locating device 48, which is mounted to the haul vehicle 30 and configured to determine a second determined position and a second determined velocity of the haul vehicle 30. As will be appreciated, the spatial locating device may include any suitable system configured to measure the position and velocity of the haul vehicle, such as a global positioning system (GPS), for example. In certain embodiments, the spatial locating device 48 may be configured to measure the position and velocity of the haul vehicle relative to a fixed point within a field (e.g., via a fixed radio transceiver). Accordingly, the spatial locating device 48 may be configured to measure the position and velocity of the haul vehicle relative to a fixed global coordinate system (e.g., via the GPS) or a fixed local coordinate system. In certain embodiments, the first transceiver 44 is configured to broadcast a second signal indicative of the second determined position and/or the second determined velocity to other vehicles within the area of communication. As discussed in detail below, the second signal from each haul vehicle may be utilized to determine which vehicle is closest to the harvester, thereby enabling the closest haul vehicle to dock with the harvester while the remaining vehicles wait for a subsequently unloading cycle.

In addition, the haul vehicle control system 43 includes an orientation sensor 49 configured to determine a pitch angle, a yaw angle, and/or a roll angle of the haul vehicle. For example, the orientation senor 49 may include a gyroscope or other sensor configured to monitor the orientation of the haul vehicle 30. In certain embodiments, the orientation sensor 49 is also configured to determine a pitch rate, a yaw rate, and/or a roll rate. Furthermore, in certain embodiments, the haul vehicle control system 43 is configured to compare the orientation (e.g., pitch angle, yaw angle, and/or roll angle) of the haul vehicle 30 to a measured orientation (e.g., pitch angle, yaw angle, and/or roll angle) of the harvester 10 to establish a relative orientation that may be utilized to enhance the accuracy of the docking process.

In the illustrated embodiment, the control system 43 includes an automated steering control system 50 configured to control a direction of movement of the haul vehicle 30, and an automated speed control system 52 configured to control a speed of the haul vehicle 30. In addition, the control system 43 includes a controller 56 communicatively coupled to the first transceiver 44, to the spatial locating device 48, to the automated steering control system 50, and to the automated speed control system 52. The controller 56 is configured to automatically control the haul vehicle 30 during docking and while docked with the harvester, thereby enhancing transfer efficiency of the agricultural product to the storage compartment. In certain embodiments, the controller 56 is configured to determine a target position and a target velocity of the haul vehicle based at least in part on the first determined position and the first determined velocity of the harvester. The controller 56 is also configured to determine a route to the target position based at least in part on the target position, the second determined position of the haul vehicle, and the second determined velocity of the haul vehicle. Once the route is determined, the controller is configured to instruct the automated steering control system and the automated speed control system to direct the haul vehicle toward the target position along the route. Upon substantially reaching the target position, the controller is configured to instruct the automated steering control system and the automated speed control system to substantially maintain the target position and the target velocity.

Because the determined velocity of the harvester is utilized to determine the target position and the route to the target position, the control system described herein may be more efficient than control systems that utilize the position of the harvester alone to facilitate docking. For example, the haul vehicle control system may utilize the determined velocity of the harvester to determine an expected position of the harvester at the time of docking. Accordingly, the target position and the route to the target position may be determined based on the expected position instead of the instantaneous position. As a result, the efficiency of the docking process may be enhanced, thereby reducing the duration and costs associated with harvesting operations. As discussed in detail below, steering angle of the harvester, orientation of the harvester, heading of the harvester, and/or acceleration of the harvester may also be utilized to determine the target position and the route to the target position, thereby further enhancing the efficiency of the docking process.

In certain embodiments, the target position is laterally and/or longitudinally offset relative to the harvester from the first determined position. For example, as discussed in detail below, a target point may be established on the storage compartment (e.g., at an approximate center point of the storage compartment). In such embodiments, the haul vehicle controller 56 may determine a target position that substantially aligns the target point with the conveyor outlet of the harvester, thereby facilitating efficient transfer of agricultural product from the harvester to the storage compartment.

In certain embodiments, the controller 56 is also configured to determine a distance between the haul vehicle and the harvester based on the first determined position of the harvester and the second determined position of the haul vehicle. If the distance is less than or equal to the engagement distance, the controller 56 is configured to enable automatic control of the haul vehicle. Otherwise, the automatic control is disabled. In certain embodiments, upon detection of a separation distance less than or equal to the engagement distance, the controller 56 is configured to instruct a user interface to present an indication to an operator that automatic control is enabled. The operator may then initiate automatic control (e.g., via the user interface), thereby instructing the controller to direct the haul vehicle toward the target position.

In certain embodiments, the controller 56 is an electronic controller having electrical circuitry configured to process data from the transceiver 44, the spatial locating device 48, and/or other components of the control system 43. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the haul vehicle 30, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as ROM. The memory device 60 may store a variety of information and may be used for various purposes. For example, the memory device 60 may store processor-executable instructions (e.g., firmware or software) for the processor 58 to execute, such as instructions for controlling the haul vehicle 30. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

In the illustrated embodiment, the automated steering control system 50 includes a wheel angle control system 62, a differential braking system 64, and a torque vectoring system 66. The wheel angle control system 62 may automatically rotate one or more wheels of the haul vehicle (e.g., via hydraulic actuators) to steer the haul vehicle along a desired route. By way of example, the wheel angle control system 62 may rotate front wheels, rear wheels, and/or intermediate wheels of the haul vehicle, either individually or in groups. The differential braking system 64 may independently vary the braking force on each lateral side of the haul vehicle to direct the haul vehicle along the desired route. Similarly, the torque vectoring system 66 may differentially apply torque from an engine to wheels and/or tracks on each lateral side of the haul vehicle, thereby directing the haul vehicle along a desired route. While the illustrated steering control system 50 includes the wheel angle control system 62, the differential braking system 64, and the torque vectoring system 66, it should be appreciated that alternative embodiments may include one or two of these systems, in any suitable combination. Further embodiments may include an automated steering control system 50 having other and/or additional systems to facilitate directing the haul vehicle along the desired route.

In the illustrated embodiment, the automated speed control system 52 includes an engine output control system 68, a transmission control system 70, and a braking control system 72. The engine output control system 68 is configured to vary the output of the engine to control the speed of the haul vehicle. For example, the engine output control system 68 may vary a throttle setting of the engine, a fuel/air mixture of the engine, a timing of the engine, and/or other suitable engine parameters to control engine output. In addition, the transmission control system 70 may adjust gear selection within a transmission to control the speed of the haul vehicle. Furthermore, the braking control system 72 may adjust braking force, thereby controlling the speed of the haul vehicle 30. While the illustrated automated speed control system 52 includes the engine output control system 68, the transmission control system 70, and the braking control system 72, it should be appreciated that alternative embodiments may include one or two of these systems, in any suitable combination. Further embodiments may include an automated speed control system 52 having other and/or additional systems to facilitate adjusting the speed of the haul vehicle.

In the illustrated embodiment, the haul vehicle control system 43 includes a user interface 74 communicatively coupled to the controller 56. The user interface 74 is configured to selectively instruct the controller 56 to automatically control the haul vehicle based on operator input. For example, the operator may position the haul vehicle within the area of engagement, and then activate the automatic docking process via input to the user interface 74. In certain embodiments, the user interface includes a display 76 configured to present information to the operator, such as whether the haul vehicle is within the area of communication, whether the haul vehicle is within the area of engagement, and whether conditions for automatic docking have been satisfied, among other parameters. In addition, as discussed in detail below, the user interface 74 may enable the operator to adjust the target point while the haul vehicle is docked with the harvester.

As illustrated, the haul vehicle 30 includes manual controls 78 configured to enable an operator to control the haul vehicle while the automatic control system is disengaged. The manual controls 78 may include manual steering control, manual transmission control, and/or manual braking control, among other controls. In the illustrated embodiment, the manual controls 78 are communicatively coupled to the controller 56. The controller 56 is configured to disengage automatic control of the haul vehicle upon receiving a signal indicative of manual control of the haul vehicle. Accordingly, if an operator controls the haul vehicle manually, the automatic docking/docked process terminates, thereby restoring control of the haul vehicle to the operator.

In the illustrated embodiment, the harvester 10 includes a control system 79 having a spatial locating device 80, which is mounted to the harvester 10 and configured to determine the first determined position and the first determined velocity of the agricultural harvester 10. Similar to the haul vehicle spatial locating device 48, the harvester spatial locating device 80 may include any suitable system configured to measure the position and velocity of the harvester, such as a global positioning system (GPS), for example. In certain embodiments, the spatial locating device 80 may be configured to measure the position and velocity of the harvester relative to a fixed point within a field (e.g., via a fixed radio transceiver). Accordingly, the spatial locating device 80 may be configured to measure the position and velocity of the harvester relative to a fixed global coordinate system (e.g., via the GPS) or a fixed local coordinate system. As illustrated, the spatial locating device 80 is communicatively coupled to a controller 82 of the harvester control system 79. Similar to the haul vehicle controller 56, the harvester controller 82 includes a processor, such as the illustrated microprocessor 84, and a memory device 86. The controller 82 is communicatively coupled to the second transceiver 46 and configured to transmit position and velocity information from the spatial locating device 80 to the transceiver 46, thereby generating the first signal indicative of the first determined position and the first determined velocity of the agricultural harvester 10.

In the illustrated embodiment, the harvester control system 79 also includes a steering angle sensor 88 and an orientation sensor 90. The steering angle sensor 88 is configured to output a signal indicative of a measured and/or determined steering angle. For example, the steering angle sensor 88 may be configured to measure an angle of certain wheels (e.g., front wheels, rear wheels, etc.) relative to the chassis of the harvester. The steering angle sensor 88 may also be configured to measure differential braking forces (e.g., the braking force applied to each lateral side of the harvester). In addition, the steering angle sensor 88 may be configured to measure torque applied to each lateral side of the harvester (e.g., torque applied to a left wheel/track and torque applied to a right wheel/track). As illustrated, the steering angle sensor 88 is communicatively coupled to the controller 82. The controller 82 is configured to receive the signal indicative of steering angle from the sensor 88, and to transmit the signal to the transceiver 46. The transceiver 46, in turn, is configured to incorporate the steering angle information into the first signal to the haul vehicle. The steering angle information may enable the haul vehicle control system to more accurately predict the expected position of the harvester, thereby enhancing the efficiency of the docking process.

Furthermore, the orientation sensor 90 is configured to output a signal indicative of a measured pitch angle, a measured yaw angle, and/or a measured roll angle of the harvester. For example, the orientation senor 90 may include a gyroscope or other sensor configured to monitor the orientation of the harvester 10. In certain embodiments, the orientation sensor 90 is also configured to determine a pitch rate, a yaw rate, and/or a roll rate. As illustrated, the orientation sensor 90 is communicatively coupled to the controller 82. The controller 82 is configured to receive the signal indicative of the orientation measurements from the orientation sensor 90, and to transmit the signal to the transceiver 46. The transceiver 46, in turn, is configured to incorporate the orientation information into the first signal to the haul vehicle. The orientation information may enable the haul vehicle control system to more accurately predict the expected position of the harvester, thereby enhancing the efficiency of the docking process.

While the illustrated harvester control system includes a steering angle sensor 88 and an orientation sensor 90, it should be appreciated that one or both of these sensors may be omitted in certain embodiments. In addition, it should be appreciated that the harvester may include additional sensors configured to measure other parameters associated with operation of the harvester. For example, in certain embodiments, the harvester control system may include an electronic compass configured to output a signal indicative of heading. In further embodiments, the harvester control system may include an accelerometer configured to output a signal indicative of acceleration (e.g., three-dimensional acceleration) of the harvester. The output from such sensors may be incorporated within the first signal to the haul vehicle. For example, in certain embodiments, the heading information may be incorporated within the first determined velocity. The heading and/or acceleration information may enable the haul vehicle control system to more accurately predict the expected position of the harvester, thereby enhancing the efficiency of the docking process. While an electronic compass and an accelerometer are described above, it should be appreciated that, in further embodiments, the harvester control system may include other and/or additional sensors.

In the illustrated embodiment, the harvester control system 79 includes a user interface 92 configured to receive input from an operator of the agricultural vehicle. As discussed in detail below, the user interface 92 includes a display 94 configured to present information to the harvester operator and/or to receive input from the operator. As illustrated, the user interface 92 is communicatively coupled to the controller 82. In certain embodiments, the controller 82 is configured to calibrate alignment of the conveyor outlet of the harvester with a storage compartment coupled to the haul vehicle. In such embodiments, the controller 82 is configured to receive a first signal from the user interface 92 indicative of alignment of the conveyor outlet with a first desired point on the storage compartment, and to determine a first position of the storage compartment relative to the agricultural harvester upon receiving the first signal. The controller 82 is also configured to receive a second signal from the user interface 92 indicative of alignment of the conveyor outlet with a second desired point on the storage compartment, diagonally opposite the first desired point, and to determine a second position of the storage compartment relative to the agricultural harvester upon receiving the second signal. In addition, the controller 82 is configured to establish a bounding rectangle having a first corner at the first desired point and a second corner at the second desired point based on the first and second positions, and to establish a target point within (e.g., at a center of) the bounding rectangle.

In the illustrated embodiment, the harvester control system 79 includes an optical sensor 93 and a measuring device 95 (e.g., a three-dimensional measuring device), each communicatively coupled to the controller 82. In certain embodiments, the optical sensor 93 (e.g., camera, infrared sensor, etc.) and the measuring device 95 are coupled to the conveyor (e.g., at the outlet) and configured to be directed toward the storage compartment. The measuring device 95 may include a light detection and ranging (LIDAR) system, a radio detection and ranging (RADAR) system, an ultrasonic measuring system, or any other suitable system configured to determine a position and/or an orientation of at least one element of the storage compartment relative to the measuring device. In certain embodiments, the optical sensor 93 is configured to output a signal to the controller 82 indicative of an image or series of images of the storage compartment. The controller 82, in turn, is configured to output a corresponding signal to the user interface 92, which directs the display 94 to present one or more visual images of the storage compartment to the operator. As will be appreciated, the optical sensor 93 may be communicatively coupled directly to the user interface 92 in alternative embodiments. The visual image(s) presented by the display 94 may assist the operator in identifying alignment of the conveyor outlet with the first and second desired points on the storage compartment. As a result, the accuracy of the alignment calibration process may be enhanced.

In certain embodiments, the controller 82 may be configured to generate one or more images based on the signal output by the measuring device 95. For example, the controller 82 may be configured to establish a three-dimensional model of a portion of the storage compartment based on the signal, and to output a signal to the user interface 92 indicative of one or more views (e.g., top view, perspective view, etc.) of the three-dimensional model. The display 94 of the user interface 92, in turn, may present the views to the operator, thereby assisting the operator in indentifying alignment of the conveyor outlet with the first and second desired points on the storage compartment.

In certain embodiments, the controller 82 is configured to adjust the first and second desired points and the corresponding first and second positions of the storage compartment relative to the agricultural harvester based on input from the measuring device 95 and/or the optical sensor 93. For example, the controller 82 may be configured to identify corners of the storage compartment based on input from the measuring device 95 and/or the optical sensor 93. If the first desired point selected by the operator is remote from a first corner of the storage compartment (e.g., toward the center of the storage compartment, etc.) or outside the storage compartment, the controller 82 may adjust the first desired point and the corresponding first position of the storage compartment relative to the agricultural harvester, such that the first desired point is closer to the first corner of the storage compartment and within the storage compartment. Similarly, if the second desired point selected by the operator is remote from a second corner of the storage compartment, e.g., diagonally opposite the first corner, or outside the storage compartment, the controller 82 may adjust the second desired point and the corresponding second position of the storage compartment relative to the agricultural harvester, such that the second desired point is closer to the second corner of the storage compartment and within the storage compartment. The controller 82 may then establish a bounding rectangle having a first corner at the first desired point and a second corner at the second desired point based on the first and second positions, and establish a target point within (e.g., at a center of) the bounding rectangle. By positioning the desired points closer to the corners of the storage compartment, the accuracy of the alignment calibration process may be enhanced. While the illustrated embodiment includes an optical sensor 93 and a measuring device 95, it should be appreciated that in alternative embodiments, the optical sensor 93 and/or the measuring device 95 may be omitted.

In certain embodiments, the controller 82 is configured to output a signal to the second transceiver 46 indicative of a position of the first corner of the bounding rectangle relative to the storage compartment, a position of the second corner of the bounding rectangle relative to the storage compartment, and a position of the target point relative to the storage compartment. The transceiver 46, in turn, is configured to incorporate data corresponding to these positions into the signal transmitted to the first transceiver 44. The haul vehicle control system 43 may utilize the positions of the first and second corners of the bounding rectangle and/or the position of the target point, in addition to the position and velocity of the harvester, to determine the target position and/or the target velocity of the haul vehicle. For example, the haul vehicle control system 43 may determine a target position that substantially aligns the target point with the conveyor outlet of the harvester. In addition, because the controller 82 outputs a signal indicative of the positions of the first and second corners of the bounding rectangle and the position of the target point upon completion of the calibration process, the haul vehicle control system 43 may detect a successful calibration upon receiving the signal. In certain embodiments, the haul vehicle control system 43 may not initiate the docking process until a successful calibration is detected.

In certain embodiments, the controller 82 is configured to laterally and/or longitudinally adjust the position of the target point (e.g., based on input from the user interface 92, the optical sensor 93, the measuring device, or a combination thereof). For example, an operator of the harvester may periodically adjust the position of the target point (e.g., based on an image provided by the optical sensor 93) during the unloading process, thereby establishing a substantially even distribution of agricultural product within the storage compartment. In addition, the controller 82 may automatically adjust the position of the target point based on input from the optical sensor 93 and/or the measuring device 95. For example, if the controller 82 receives a signal from the optical sensor 93 and/or the measuring device 95 indicative of a large quantity of agricultural product positioned beneath the conveyor outlet (e.g., approaching the top of the storage compartment), the controller 82 may adjust the position of the target point (e.g., laterally and/or longitudinally) such that the conveyor outlet is positioned over a portion of the storage compartment having a lower product level. Upon adjustment of the target point position, the updated position is transmitted to the haul vehicle control system 43 (e.g., via the transceiver 46). Upon receiving the updated target point position, the haul vehicle control system 43 adjusts the target position such that the conveyor outlet is aligned with the adjusted target point. In certain embodiments, the operator of the haul vehicle may also adjust the position of the target point via the user interface 74. In addition, the position of the target point may be limited to locations within the bounding rectangle, thereby substantially reducing or eliminating the possibility of product loss during the unloading process.

In the illustrated embodiment, the agricultural harvester 10 includes a product delivery system 96 configured to transfer agricultural product from the harvester to the storage compartment. As illustrated, the product delivery system 96 is communicatively coupled to the controller 82. In certain embodiments, the controller 82 is configured to automatically engage product flow from the conveyor outlet to the storage compartment (e.g., via activation of the product delivery system 96) while the conveyor outlet is within the bounding rectangle. In further embodiments, the controller 82 is configured to automatically engage product flow from the conveyor outlet to the storage compartment (e.g., via activation of the product delivery system 96) while the conveyor outlet is within a threshold range of the target point.

Figure 3:
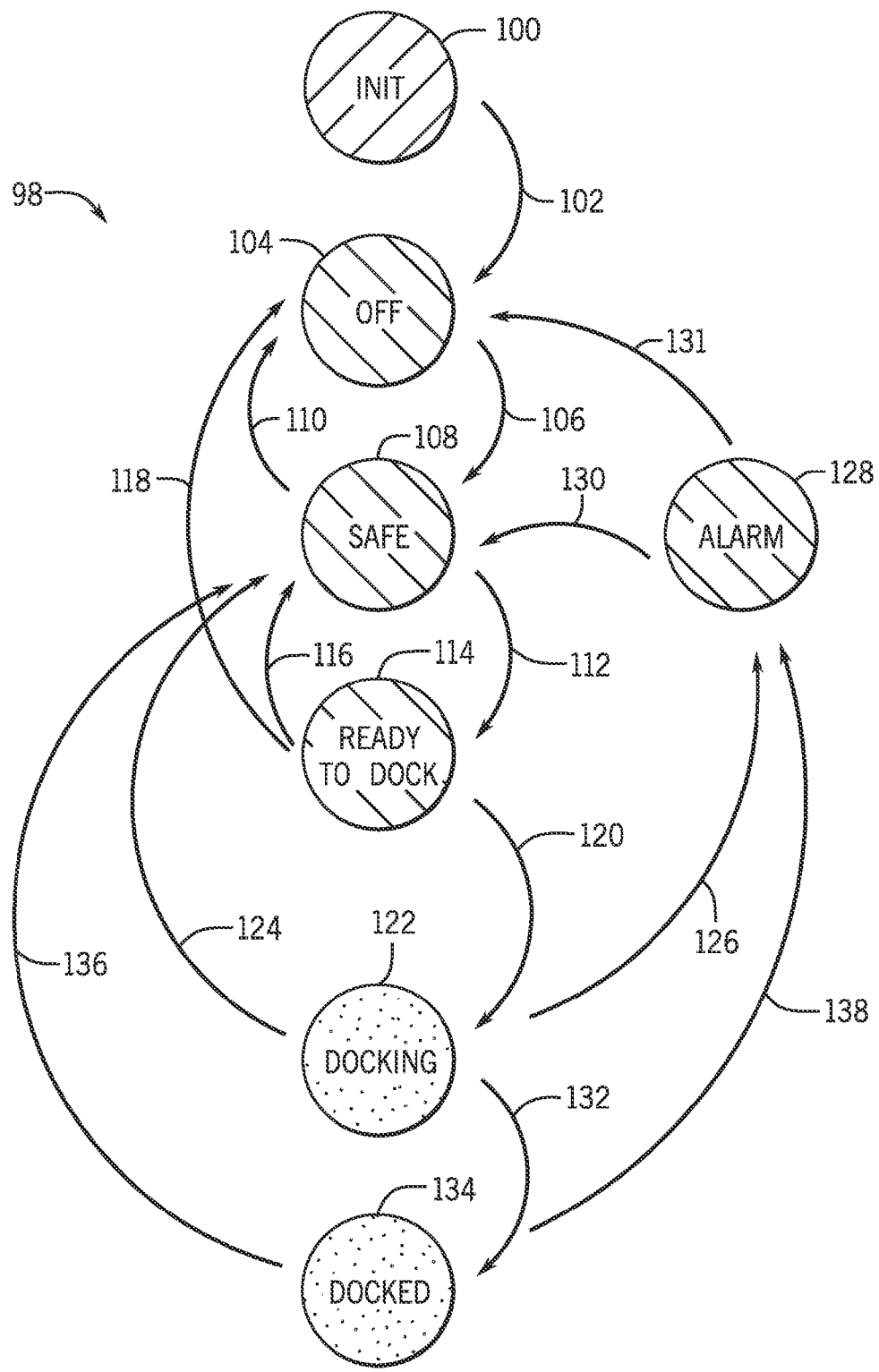
FIG. 3 is a state diagram of an embodiment of a technique for controlling a haul vehicle.

FIG. 3 is a state diagram of an embodiment of a technique 98 for controlling a haul vehicle. Prior to initiating the docking process, the control system is in an initialization state 100. As indicated by the arrow 102, booting the control system transitions the control system from the initialization state 100 to an "off" state 104. Switching the control system on, as indicated by the arrow 106 transitions the control system from the "off" state 104 to a "safe" state 108. Conversely, switching the control system off, as indicated by the arrow 110, transitions the control system to the "off" state 104. If no faults are detected within the system, as indicated by the arrow 112, the control system transitions to a "ready to dock" state 114. While in the "ready to dock" state, if a fault is detected, as indicated by the arrow 116, the control system transitions to the "safe" state 108. In addition, switching the control system off, as indicated by the arrow 118, transitions the control system from the "ready to dock" state 114 to the "off" state 104.

While the control system is in the "ready to dock" state 114, the user interface may provide an indication to the operator that the haul vehicle is ready to dock. When the operator initiates docking (e.g., via the user interface) and the harvester confirms initiation of the docking process, as indicated by the arrow 120, the control system transitions to a "docking" state 122. While in the "docking" state 122, the automated steering control system and the automated speed control system direct the haul vehicle toward the target position. If the operator controls the haul vehicle manually, as indicated by the arrow 124, the control system transitions to the "safe" state 108, thereby disengaging automatic control of the haul vehicle. In addition, if a fault is detected (e.g., communication loss, the haul vehicle is unable to reach the target position, a heading error is detected, a speed range is exceeded, etc.), as indicated by the arrow 126, the control system transitions to an "alarm" state 128. For example, the user interface may present the operator with a visual and/or audible indication that a fault is detected and/or the nature of the fault. As indicated by the arrow 130, the automatic control is disengaged, which transitions the control system to the "safe" state 108. However, if the automatic control is also switched off, as indicated by the arrow 131, the control system transitions to the "off" state 104.

After the haul vehicle reaches the target position for a predetermined time interval, as indicated by the arrow 132, the control system transitions to the "docked" state 134. By way of example, the predetermined time interval may be about 1 second, about 2 seconds, about 3 seconds, about 4 seconds, or more. While in the "docked" state 134, the automated steering control system and the automated speed control system substantially maintain the target position and the target velocity. If the operator controls the haul vehicle manually, as indicated by the arrow 136, the control system transitions to the "safe" state 108, thereby disengaging automatic control of the haul vehicle. In addition, if a fault is detected (e.g., communication loss, the haul vehicle is unable to reach the target position, etc.), as indicated by the arrow 138, the control system transitions to an "alarm" state 128. For example, the user interface may present the operator with a visual and/or audible indication that a fault is detected and/or the nature of the fault. As indicated by the arrow 130, the automatic control is disengaged, which transitions the control system to the "safe" state 108. However, if the automatic control is also switched off, as indicated by the arrow 131, the control system transitions to the "off" state 104.

Figure 4:
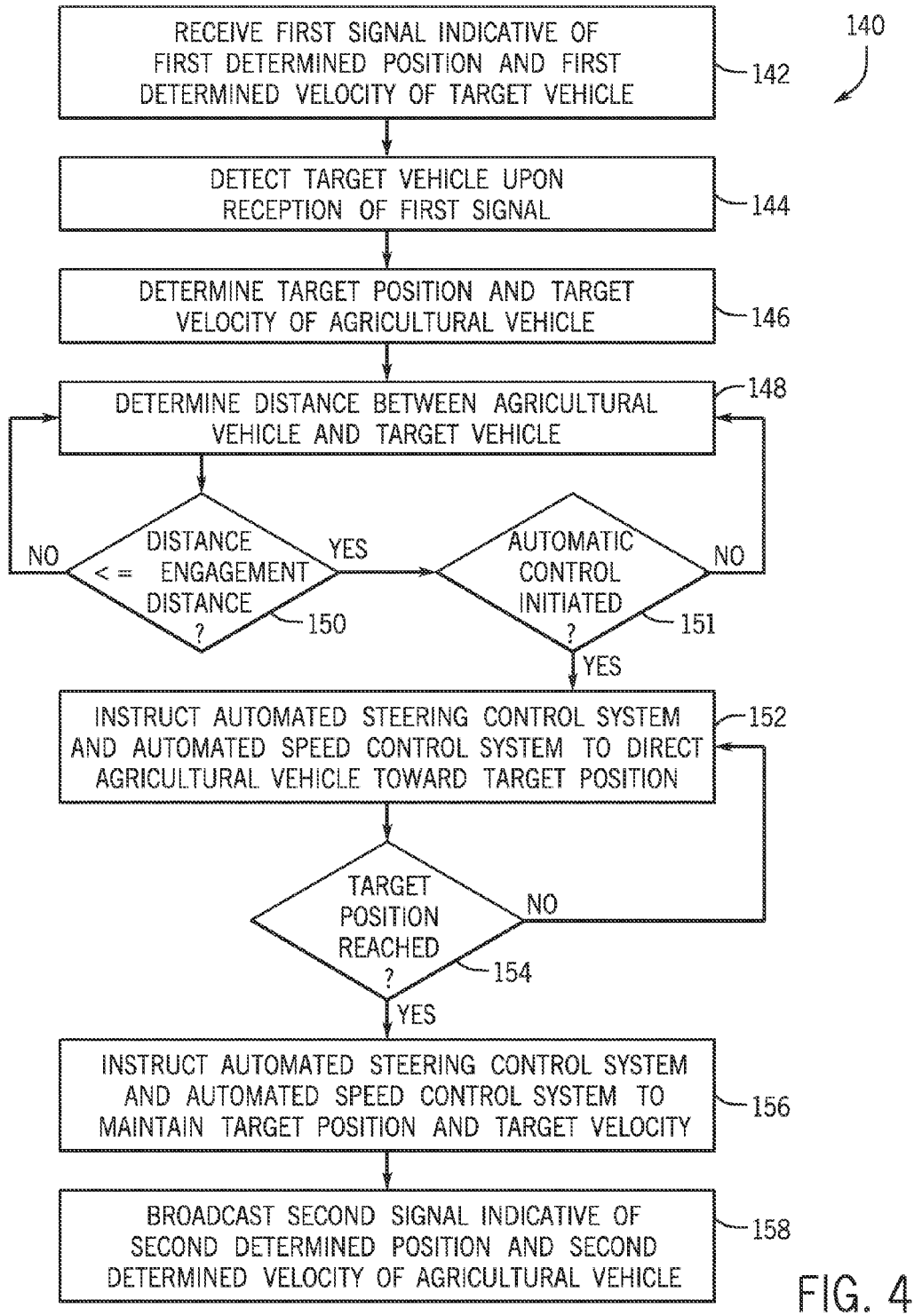
FIG. 4 is a flow diagram of an embodiment of a method for controlling a haul vehicle.

FIG. 4 is a flow diagram of an embodiment of a method 140 for controlling an agricultural vehicle, such as the haul vehicle. First, as represented by block 142, a first signal indicative of a first determined position and a first determined velocity of a target vehicle (e.g., the agricultural harvester) is received. As previously discussed, the first signal may be transmitted from a second transceiver of the target vehicle and received by a first transceiver of the agricultural vehicle. The target vehicle is detected upon reception of the first signal, as represented by block 144. In addition, a target position and a target velocity of the agricultural vehicle is determined based on the first determined position and the first determined velocity of the target vehicle, as represented by block 146. In certain embodiments, a steering angle of the target vehicle, a pitch angle of the target vehicle, a roll angle of the target vehicle, and/or a yaw angle of the target vehicle, which may be included within the first signal, are also utilized to determine the target position and the target velocity of the agricultural vehicle. For example, as previously discussed, an expected position of the target vehicle at the time of docking may be determined based on the velocity, steering angle, and/or orientation of the target vehicle. Accordingly, the target position may be determined based on the expected position instead of the instantaneous position.

Next, as represented by block 148, a distance between the agricultural vehicle and the target vehicle is determined. The distance is then compared to an engagement distance, as represented by block 150. If the distance is less than or equal to the engagement distance, automatic control of the agricultural vehicle is enabled. Upon initiation of automatic control by an operator, as represented by block 151, an automated steering control system and an automated speed control system are instructed to direct the agricultural vehicle toward the target position, as represented by block 152. For example, if the target vehicle is positioned in front of the agricultural vehicle, the automated speed control system may increase the speed of the agricultural vehicle. Conversely, if the target vehicle is positioned behind the agricultural vehicle, the automated speed control system may stop the agricultural vehicle until the target vehicle reaches a docking position. In addition, the steering control system may adjust wheel angles, for example, to steer the agricultural vehicle toward the target position.

The position of the agricultural vehicle is then compared to the target position, as represented by block 154. If the target position is reached, the automated steering control system and the automated speed control system are instructed to maintain the target position and the target velocity, as represented by block 156. For example, if the speed of the target vehicle increases, the automated speed control system may increase the speed of the agricultural vehicle to match the speed of the target vehicle. Similarly, if the target vehicle initiates a turn, the automated steering control system may direct the agricultural vehicle to match the movement of the target vehicle. As a result, alignment between the conveyor outlet and the storage compartment may be maintained throughout the unloading process, thereby substantially reducing or eliminating agricultural product loss and/or increasing the efficiency of the unloading process.

As represented by block 158, a second signal indicative of a second determined position and a second determined velocity of the agricultural vehicle is broadcast to other agricultural vehicles within the area of communication. Other agricultural vehicles may utilize this information to determine which vehicle is closest to the target vehicle. For example, if multiple agricultural vehicles are within the area of engagement, each vehicle may compare its position, and the position of the other vehicles, to the position of the target vehicle. The control system of the vehicle closest to the target vehicle transitions to the "docking" state, while the control systems of the farther vehicles remain in a "ready to dock" state. In this manner, the closest vehicle docks with the target vehicle, while the remaining vehicles wait for a subsequent unloading cycle.

Figure 5:
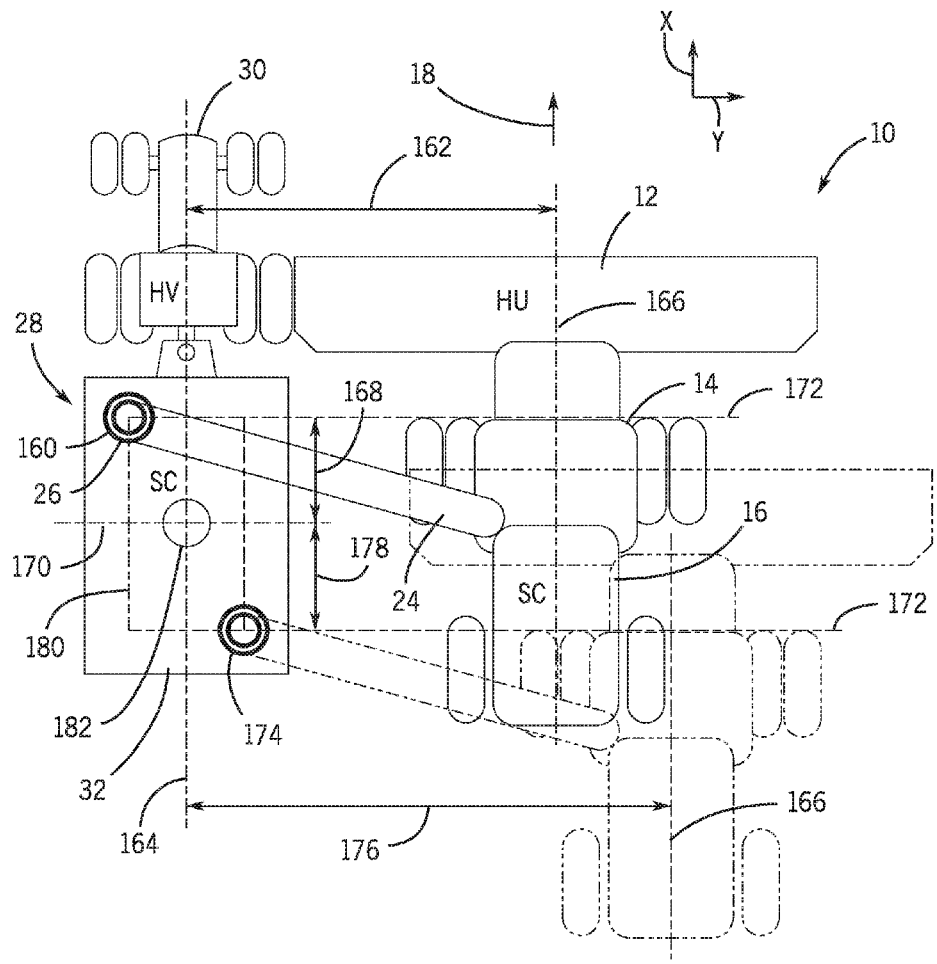
FIG. 5 is a schematic diagram of an embodiment of an agricultural harvester and an agricultural product transportation system.

FIG. 5 is a schematic diagram of an embodiment of an agricultural harvester 10 and an agricultural product transportation system 28. In certain embodiments, the harvester controller is configured to calibrate alignment of the conveyor outlet 26 with the storage compartment 32, thereby enabling the haul vehicle controller to establish a target position that facilitates efficient transfer of the agricultural product from the harvester to the storage compartment. In such embodiments, the harvester controller is configured to receive a first signal from a user interface indicative of alignment of the conveyor outlet 26 with a first desired point 160 on the storage compartment 32. For example, an operator of the haul vehicle 30 may position the storage compartment 32 (e.g., via manual control of the haul vehicle) such that the conveyor outlet 26 is aligned with the first desired point 160 at a front left portion of the storage compartment 32, as illustrated by the harvester 10 in solid lines. Alternatively, an operator of the harvester 10 may position the harvester 10 (e.g., via manual control of the harvester) such that the conveyor outlet 26 is aligned with the first desired point 160. Once aligned, the operator of the harvester 10 or the operator of the haul vehicle 30 depresses a button on the user interface that transmits the first signal indicative of alignment to the harvester controller.

Upon receiving the first signal, the harvester controller determines a first position of the storage compartment 32 relative to the harvester 10. In the illustrated embodiment, the first position includes a lateral distance 162 (e.g., along the lateral axis Y) that extends between a lateral centerline 164 of the storage compartment 32 and a lateral centerline 166 of the harvester 10. The first position also includes a longitudinal distance 168 (e.g., along the longitudinal axis X) that extends between a longitudinal centerline 170 of the storage compartment 32 and a reference line 172 of the harvester 10. However, it should be appreciated that the position of the storage compartment 32 relative to the harvester 10 may include lateral and longitudinal distances based on other suitable reference lines.

The harvester controller is also configured to receive a second signal from the user interface indicative of alignment of the conveyor outlet 26 with a second desired point 174 on the storage compartment 32, diagonally opposite the first desired point 160. For example, an operator of the haul vehicle 30 may position the storage compartment 32 (e.g., via manual control of the haul vehicle) such that the conveyor outlet 26 is aligned with the second desired point 174 at a rear right portion of the storage compartment 32, as illustrated by the harvester 10 in phantom lines. Alternatively, an operator of the harvester 10 may position the harvester 10 (e.g., via manual control of the harvester) such that the conveyor outlet 26 is aligned with the second desired point 174. Once aligned, the operator of the harvester 10 or the operator of the haul vehicle 30 depresses a button on the user interface that transmits the second signal indicative of alignment to the harvester controller.

Upon receiving the second signal, the harvester controller determines a second position of the storage compartment 32 relative to the harvester 10. In the illustrated embodiment, the second position includes a lateral distance 176 (e.g., along the lateral axis Y) that extends between the lateral centerline 164 of the storage compartment 32 and the lateral centerline 166 of the harvester 10. The second position also includes a longitudinal distance 178 (e.g., along the longitudinal axis X) that extends between the longitudinal centerline 170 of the storage compartment 32 and the reference line 172 of the harvester 10. As noted above, it should be appreciated that the position of the storage compartment 32 relative to the harvester 10 may include lateral and longitudinal distances based on other suitable reference lines. However, the first and second positions utilize the same references lines/coordinate system. In certain embodiments, the harvester controller is configured to adjust the first and second desired points and the corresponding first and second positions of the storage compartment relative to the harvester based on input from the optical sensor and/or the measuring device, thereby enhancing the accuracy of the alignment calibration process.

The harvester controller is also configured to establish a bounding rectangle 180 having a first corner at the first desired point 160 and a second corner at the second desired point 174 based on the first position and the second position of the storage compartment 32 relative to the harvester 10. In certain embodiments, the harvester controller may enable and/or automatically engage product flow from the conveyor outlet 26 to the storage compartment 32 while the conveyor outlet 26 is within the bounding rectangle 180. Conversely, the harvester controller may disable and/or automatically disengage product flow from the conveyor outlet 26 to the storage compartment 32 while the conveyor outlet 26 is outside of the bounding rectangle 180. While the illustrated bounding rectangle 180 is established based on the front left point and the rear right point, it should be appreciated that the bounding rectangle may also be established based on a front right point and a rear left point.

In addition, the harvester controller is configured to establish a target point 182 within (e.g., at the center of) the bounding rectangle 180. In the illustrated embodiment, the target point 182 is positioned at the lateral midpoint and the longitudinal midpoint of the bounding rectangle 180, i.e., at the center of the bounding rectangle 180. However, it should be appreciated that the harvester controller may be configured to establish the target point 182 at other locations within the bounding rectangle (e.g., laterally and/or longitudinally offset from the center). In certain embodiments, the harvester controller is configured to automatically engage product flow from the conveyor outlet 26 to the storage compartment 32 while the conveyor outlet 26 is within a threshold range of the target point 182. As discussed in detail below, the threshold range may be manually adjusted via a user interface. In addition, the harvester controller may be configured to adjust a lateral position and/or a longitudinal position of the target point (e.g., away from the center of the bounding rectangle) based on a signal from the user interface, from the optical sensor, from the measuring device, or a combination thereof. For example, an operator may adjust the position of the target point via the user interface during the unloading process, thereby facilitating substantially even distribution of the agricultural product within the storage compartment 32. In addition, the harvester controller may automatically adjust the position of the target point based on input from the optical sensor and/or the measuring device to establish a substantially even distribution of the agricultural product within the storage compartment 32. However, the controller may limit the adjustment of the target point to locations within the bounding rectangle, thereby substantially reducing or eliminating the possibility of product loss during the unloading process.

In certain embodiments, the harvester controller is configured to store data indicative of the position of the first corner of the bounding rectangle relative to the storage compartment, the position of the second corner of the bounding rectangle relative to the storage compartment, and the position of the target point relative to the storage compartment (e.g., within the memory device of the controller) to facilitate subsequent alignment of the conveyor outlet 26 with the storage compartment 32. For example, the harvester controller may receive a signal indicative of an identity of the storage compartment 32 (e.g., a unique identification number). If such a signal is received, the harvester controller associates the identity of the storage compartment with the data indicative of the positions of the first and second corners of the bounding rectangle and the position of the target point. The harvester controller then stores these positions and the identity, thereby facilitating subsequent alignment of the conveyor outlet 26 with the storage compartment 32.

In certain embodiments, the harvester controller is configured to determine whether the dimensions of the bounding rectangle 180 are within a threshold range prior to storing the identity, and the data indicative of the positions of the first and second corners of the bounding rectangle and the position of the target point. For example, if the bounding rectangle is smaller than a minimum expected size or larger than a maximum expected size, the controller may instruct the operator (e.g., via the user interface) to recalibrate the alignment of the conveyor outlet and the storage compartment. In addition, the harvester controller may be configured to determine whether the first position and the second position of the storage compartment relative to the harvester are within a threshold range prior to storing the identity, and the data indicative of the positions of the first and second corners of the bounding rectangle and the position of the target point. For example, if the storage compartment is closer than a minimum desired separation distance or farther than a maximum desired separation distance, the controller may instruct the operator (e.g., via the user interface) to recalibrate the alignment of the conveyor outlet and the storage compartment. Once the calibration process is complete, the harvester control system may send a signal to the haul vehicle control system indicative of a successful calibration, thereby enabling the haul vehicle control system to initiate docking with the harvester.

Figure 6:
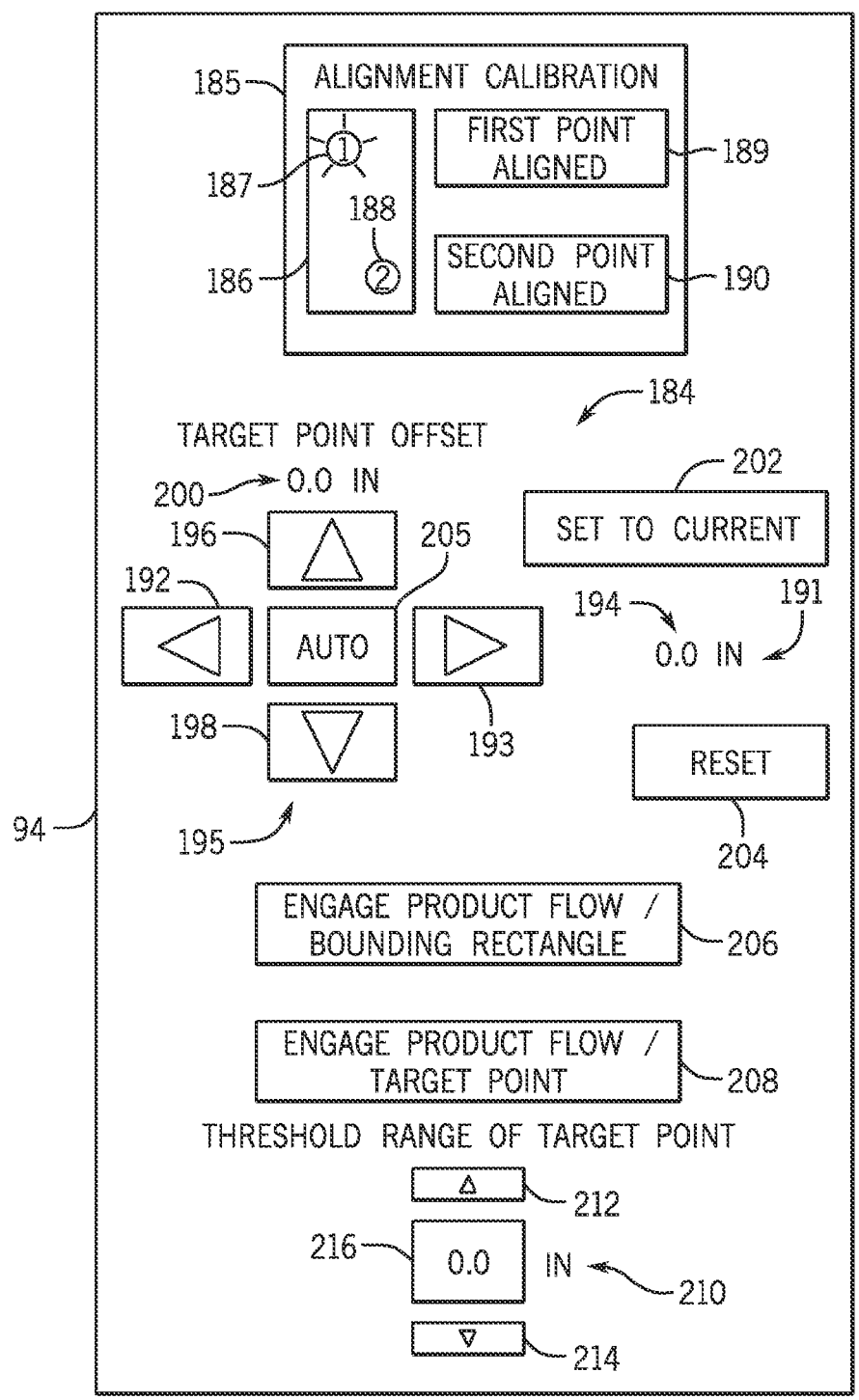
FIG. 6 is a block diagram of an embodiment of a display that may be employed within a user interface of the haul vehicle of FIG. 5.

FIG. 6 is a block diagram of an embodiment of a display 94 that may be employed within the user interface 92 of the harvester 10 of FIG. 5. While the illustrated display 94 is described below with reference to the harvester 10, it should be appreciated that the same display or a similar display may be employed within the user interface 74 of the haul vehicle 30. As illustrated, the display 94 presents a graphical representation 184 of various controls that may be utilized to facilitate calibration of the conveyor outlet/storage compartment alignment, adjustment of the target point, and/or control of the unloading process. In the illustrated embodiment, the display 94 includes an alignment calibration screen 185. The alignment calibration screen 185 includes a graphical representation 186 of the bounding rectangle, a first indicator 187 representative of the first corner of the bounding rectangle, and a second indicator 188 representative of the second corner of the bounding rectangle. The alignment calibration screen 185 also includes a "first point aligned" button 189 and a "second point aligned" button 190.

As previously discussed, data associated with each previously calibrated storage compartment (e.g., data indicative of the positions of the first and second corners of the bounding rectangle and the position of the target point) is stored within the harvester control system. Accordingly, if a previously calibrated storage compartment is detected by the harvester control system, the alignment calibration screen 185 may be disabled (e.g., "grayed out"). However, if a new storage compartment is detected, the alignment calibration screen is enabled, thereby prompting the operator to initiate the calibration process. Once the calibration process is complete, the data associated with the new storage compartment is stored within the harvester control system for subsequent docking processes.

During the calibration process, the first indicator 187 illuminates, as illustrated, thereby prompting the operator (e.g., of the harvester or the haul vehicle) to align the conveyor outlet with the first desired point at the front left of the storage compartment. Once aligned, the operator depresses the "first point aligned" button 189. In certain embodiments, the operator is provided with an indication that the first desired point is accepted by the harvester control system (e.g., via a change in color of the first indicator 187, darkening the first indicator 187, etc.). However, if the first desired point is not accepted by the harvester controller (e.g., because the distance between the haul vehicle/storage compartment and the harvester is less than a minimum threshold distance or greater than a maximum threshold distance), the user interface may indicate a fault (e.g., via displaying a text message to the operator, changing the color of the first indicator 187, etc.). The operator may then realign the conveyor outlet with the first desired point.

Once the harvester controller accepts the first desired point, the second indicator 188 illuminates, thereby prompting the operator (e.g., of the harvester or the haul vehicle) to align the conveyor outlet with the second desired point at the rear right of the storage compartment. Once aligned, the operator depresses the "second point aligned" button 190. In certain embodiments, the operator is provided with an indication that the second desired point is accepted by the harvester control system (e.g., via a change of color of the second indicator 188, darkening the second indicator 188, etc.). However, if the second desired point is not accepted by the harvester controller (e.g., because the distance between the haul vehicle/storage compartment and the harvester is less than a minimum threshold distance or greater than a maximum threshold distance, or the dimensions of the bounding rectangle are larger or smaller than an expected range, etc.), the user interface may indicate a fault (e.g., via displaying a text message to the operator, changing the color of the second indicator 188, etc.). The operator may then realign the conveyor outlet with the second desired point and/or restart the calibration process.

Once the operator has aligned the conveyor outlet with the first and second desired points, the harvester controller may adjust the first and second desired points based on input from the optical sensor and/or the measuring device. The harvester controller then establishes the bounding rectangle having a first corner at the first desired point and a second corner at the second desired point. The harvester controller also establishes a target point within (e.g., at the center of) the bounding rectangle. As previously discussed, the position of the target point may be adjusted based on user input. In the illustrated embodiment, the display 94 includes a target point offset screen having controls configured to adjust the position of the target point (e.g., away from the center of the bounding rectangle). As illustrated, the display includes a lateral position adjustment section 191 having a left arrow button 192, a right arrow button 193, and a numerical display 194. Depressing the left arrow button 192 induces the display 194 to indicate movement of the target point to the left (e.g., in inches relative to the original target point). Similarly, depressing the right arrow button 193 induces the display 194 to indicate movement of the target point to the right (e.g., in inches relative to the original target point).

The display 94 also includes a longitudinal position adjustment section 195 having a forward arrow button 196, a rearward arrow button 198, and a numerical display 200. Depressing the forward arrow button 196 induces the display 200 to indicate movement of the target point in the forward direction (e.g., in inches relative to the original target point). Similarly, depressing the rearward arrow button 198 induces the display 200 to indicate movement of the target point in the rearward direction (e.g., in inches relative to the original target point). While the illustrated displays 194 and 200 are configured to present the offset distances in inches, it should be appreciated that, in alternative embodiments, the offset distances may be expressed in terms of a percentage of the lateral and/or longitudinal extent of the bounding rectangle. In further embodiments, the displays 194 and 200 may present a graphical representation of the position of the target point within the bounding rectangle.

Once the desired position of the target point is selected, the operator may depress the "set to current" button 202. Depressing the button 202 induces the user interface to send a signal to the harvester controller that instructs the controller to adjust the lateral and/or longitudinal position of the target point. By way of example, the operator may periodically adjust the position of the target point during the unloading process to establish a substantially even distribution of agricultural product within the storage compartment. The operator may reset the target point to the original position by depressing the reset button 204. In certain embodiments, each adjustment of the target point may be relative to the original position of the target point. Alternatively, each adjustment to the target point may be relative to the previously selected target point position.

In certain embodiments, the lateral and/or longitudinal position of the established target point (e.g., the target point established by the alignment calibration process) may be adjusted. For example, an operator may adjust the position of the established target point (e.g., relative to the bounding rectangle) via the target point offset controls or additional controls provided on the display 94. Once the position of the established target point is adjusted, the updated position is stored within the harvester control system for subsequent docking processes. Accordingly, at least a first adjustment of the target point via the target point offset controls is relative to the updated position of the established target point. In further embodiments, the positions of the first and second corners of the established bounding rectangle may be adjusted (e.g., via controls provided on the display 94) to create a bounding rectangle having a desired size and/or position.

In the illustrated embodiment, the target point offset screen includes an "auto" button 205. Depressing the "auto" button 205 induces the user interface to output a signal to the harvester controller that instructs the controller to automatically adjust the position of the target point. Upon activation of automatic target point control, the harvester controller may automatically adjust the position of the target point based on input from the optical sensor and/or the measuring device. For example, if the harvester controller receives a signal from the optical sensor and/or the measuring device indicative of a large quantity of agricultural product positioned beneath the conveyor outlet (e.g., approaching the top of the storage compartment), the controller may adjust the position of the target point (e.g., laterally and/or longitudinally) such that the conveyor outlet is positioned over a portion of the storage compartment having a lower product level. As a result, a substantially even distribution of agricultural product may be established within the storage compartment.

In further embodiments, the target point offset screen may include buttons indicative of predetermined target point offsets. For example, the target point offset screen may include a "forward" button, a "center" button, and a "rearward" button. Depressing the "forward" button induces the user interface to send a signal to the harvester controller that instructs the controller to adjust the position of the target point to a predetermined forward position. Similarly, depressing the "rearward" button induces the user interface to send a signal to the harvester controller that instructs the controller to adjust the position of the target point to a predetermined rearward position. As will be appreciated, additional buttons indicative of other predetermined target point offsets (e.g., lateral offsets, etc.) may be included in further embodiments.

In the illustrated embodiment, the display 94 includes an "engage product flow/bounding rectangle" button 206. Depressing the button 206 sends a signal to the harvester controller instructing the controller to automatically engage product flow from the conveyor outlet to the storage compartment while the conveyor outlet is within the bounding rectangle. The display 94 also includes an "engage product flow/target point" button 208. Depressing the button 208 sends a signal to the harvester controller instructing the controller to automatically engage product flow from the conveyor outlet to the storage compartment while the conveyor outlet is within a threshold range of the target point. In the illustrated embodiment, the threshold range may be adjusted by a "threshold range of target point" section 210 of the display 94. As illustrated, the section 210 includes a first arrow button 212 configured to increase the threshold range, a second arrow button 214 configured to decrease the threshold range, and a numeric display 216 configured to display the threshold range. Once the threshold range is input and the button 208 is depressed, product flows to the storage compartment while the conveyor outlet is within the threshold range of the target point. Furthermore, in certain embodiments, the harvester controller may automatically disengage the product flow while the conveyor outlet is positioned outside of the bounding rectangle.

Figure 7A:
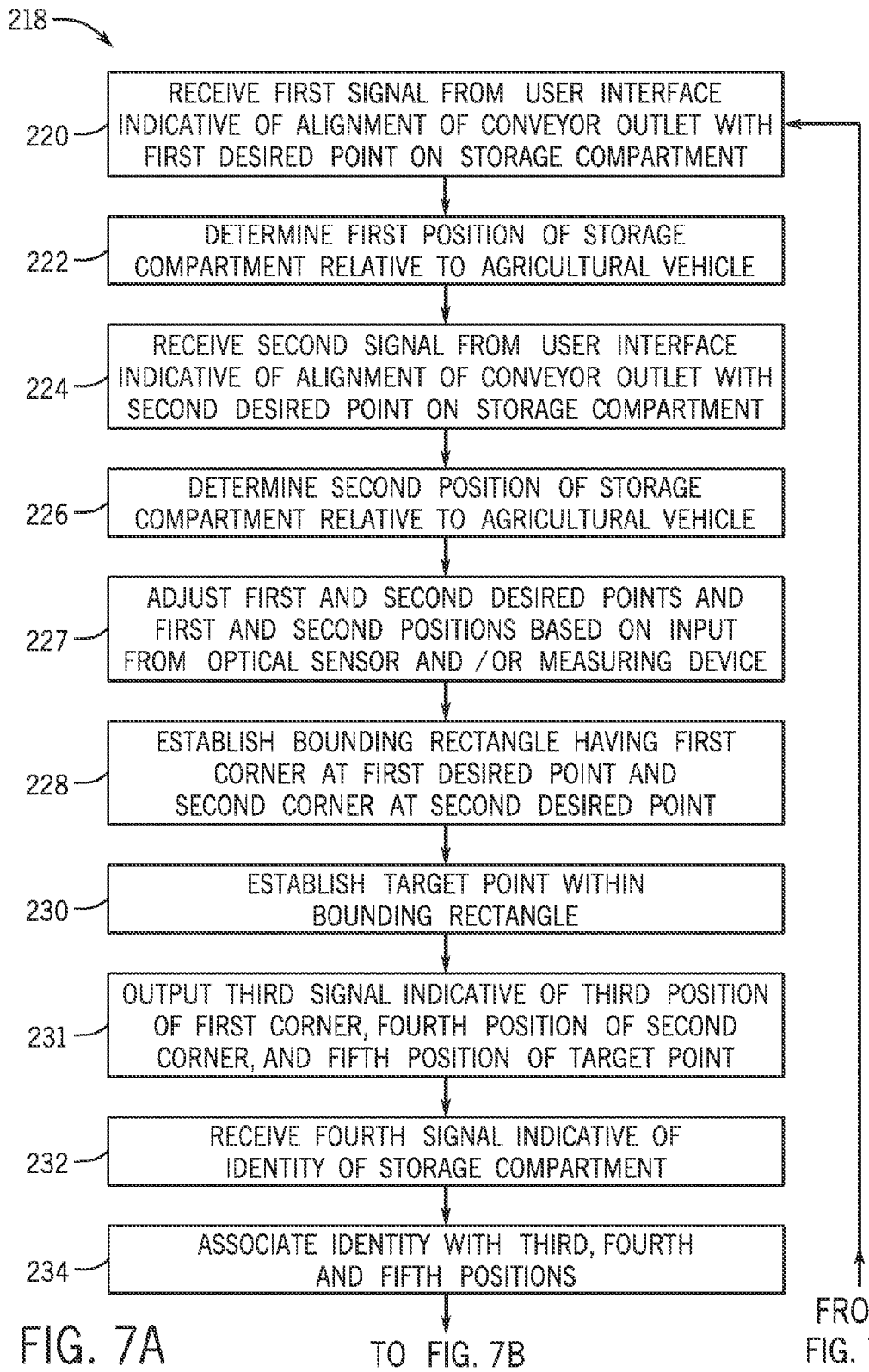
FIGS. 7A and 7B are flow diagrams of an embodiment of a method for calibrating alignment of a conveyor outlet of an agricultural harvester with a storage compartment of an agricultural product transportation system.
Figure 7B:
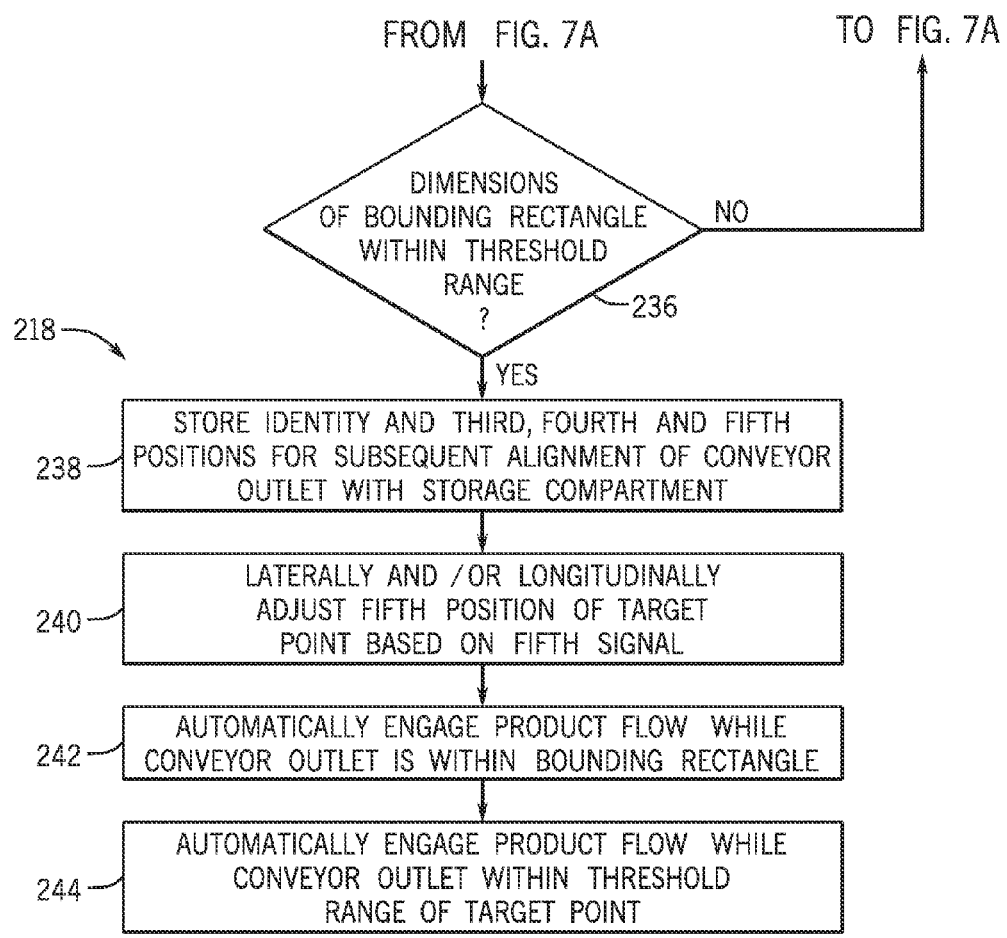

FIGS. 7A and 7B are flow diagrams of an embodiment of a method 218 for calibrating alignment of a conveyor outlet of an agricultural harvester with a storage compartment of an agricultural product transportation system. First, as represented by block 220, a first signal indicative of alignment of the conveyor outlet with a first desired point on the storage compartment is received from a user interface. For example, when the conveyor outlet is aligned with the first desired point on the storage compartment, an operator may depress a graphical representation of a "first point aligned" button on a display of the user interface. The user interface, in turn, may output the first signal. Upon receiving the first signal, a first position of the storage compartment relative to the agricultural vehicle is determined, as represented by block 222.

Next, as represented by block 224, a second signal indicative of alignment of the conveyor outlet with a second desired point on the storage compartment, diagonally opposite the first desired point, is received from the user interface. For example, when the conveyor outlet is aligned with the second desired point on the storage compartment, an operator may depress a graphical representation of a "second point aligned" button on a display of the user interface. The user interface, in turn, may output the second signal. Upon receiving the second signal, a second position of the storage compartment relative to the agricultural vehicle is determined, as represented by block 226. In certain embodiments, as represented by block 227, the first and second desired points and the first and second positions of the storage compartment relative to the agricultural vehicle are adjusted based on input from the measuring device and/or the optical sensor. This step may enhance the accuracy of the alignment calibration process by positioning the desired points closer to the corners of the storage compartment.

Once the first and second positions of the storage compartment relative to the agricultural vehicle are determined, a bounding rectangle is established, as represented by block 228. The bounding rectangle has a first corner at the first desired point and a second corner at the second desired point. In addition, as represented by block 230, a target point is established within (e.g., at the center of) the bounding rectangle. That is, the target point is established at the lateral midpoint between the first and second corners, and at the longitudinal midpoint between the first and second corners. Once the bounding rectangle and the target point are established, a third signal indicative of a third position of the first corner of the bounding rectangle relative to the storage compartment, a fourth position of the second corner of the bounding rectangle relative to the storage compartment, and a fifth position of the target point relative to the storage compartment is output, as represented by block 231. As previously discussed, the third signal may be transmitted to the haul vehicle, thereby enabling the haul vehicle controller to determine a target position that aligns the target point with the conveyor outlet.

It should be appreciated that the third signal indicative of the third position, the fourth position, and the fifth position may include a position of the first corner of the bounding rectangle, a position of the second corner of the bounding rectangle, and a position of the target point relative to a fixed point on the storage compartment (e.g., the intersection of the lateral and longitudinal centerlines of the storage compartment). Alternatively, the third signal may include the first position of the storage compartment relative to the agricultural vehicle, which is indicative of the third position, and the second position of the storage compartment relative to the agricultural vehicle, which is indicative of the fourth position. For example, the third position may be determined based on the first position and the offset between the agricultural vehicle (e.g., the intersection of the lateral centerline and the reference line of the agricultural vehicle) and the conveyor outlet, and the fourth position may be determined based on the second position and the offset between the agricultural vehicle and the conveyor outlet. In addition, the fifth position may be determined based on the first position, the second position, and the offset between the agricultural vehicle and the conveyor outlet.

In certain embodiments, a fourth signal indicative of an identity of the storage compartment is received (e.g., from the haul vehicle transceiver), as represented by block 232. In such embodiments, the identity is associated with the third, fourth, and fifth positions, as represented by block 234. The dimensions of the bounding rectangle are then compared to a threshold range, as represented by block 236. As previously discussed, the threshold range may be associated with a minimum and/or a maximum expected size of the storage compartment. If the dimensions of the bounding rectangle are within the threshold range, the identity of the storage compartment and the third, fourth, and fifth positions are stored for subsequent alignment of the conveyor outlet with the storage compartment, as represented by block 238. Accordingly, once the calibration process is complete, subsequent docking of the storage compartment with the agricultural harvester may be initiated without performing additional calibration procedures. In certain embodiments, the first position and the second position are also compared to a threshold range prior to storing the identity and the third, fourth, and fifth positions, thereby verifying that a desired spacing is established between the agricultural vehicle and the storage compartment.

In the illustrated embodiment, the fifth position of the target point may be laterally and/or longitudinally adjusted based on a fifth signal (e.g., from the user interface, from the optical sensor, from the measuring device, or a combination thereof), as represented by block 240. As previously discussed, the user interface may include a display having a "target point offset" screen. This screen enables an operator to adjust the position of the target point via graphical representations of indicator arrows. In addition, the harvester controller may automatically adjust the position of the target point based on input from the optical sensor and/or the measuring device. Once the position of the target point is adjusted, the new target point may be transmitted to the haul vehicle controller, thereby facilitating alignment of the conveyor outlet with the new target point. By adjusting the target point during the unloading operation, agricultural product may be substantially evenly distributed throughout the storage compartment. In addition, the user interface may enable the operator to reset the target point to the initiation position, e.g., centered within the bounding rectangle.

In certain embodiments, product flow from the conveyor outlet to the storage compartment may be automatically engaged while the conveyor outlet is within the bounding rectangle, as represented by block 242. In such embodiments, the agricultural product may continue to flow even as movement of the harvester relative to the storage compartment (e.g., due to variations in the terrain) varies the position of the conveyor outlet within the bounding rectangle. However, if the conveyor outlet moves to a position outside of the bounding rectangle, product flow is automatically terminated, thereby substantially reducing or eliminating product loss. In further embodiments, product flow from the conveyor outlet to the storage compartment may be automatically engaged while the conveyor outlet is within a threshold range of the target point, as represented by block 244. As previously discussed, the threshold range is adjustable via the user interface (e.g., based on expected movement of the harvester relative to the storage compartment).

While the alignment calibration process is described above with regard to calibrating alignment of a conveyor outlet with a single storage compartment of an agricultural product transportation system, it should be appreciated that in alternative embodiments, the alignment calibration process may include calibrating alignment of the conveyor outlet with multiple storage compartments of the agricultural product transportation system. For example, in certain embodiments, multiple grain carts (e.g., 2, 3, 4, 5, 6, or more) may be arranged in tandem behind a haul vehicle. In such embodiments, the alignment calibration process described above may be performed for each grain cart in sequence. Accordingly, the conveyor may efficiently transfer agricultural product to each grain cart (e.g., in a sequential pattern) during operation of the harvester.

While the first determined position and the first determined velocity of the harvester, and the second determined position and the second determined velocity of the haul vehicle are determined with respect to a fixed coordinate system in the embodiments described herein, it should be appreciated that, in alternative embodiments, the first determined position, the first determined velocity, the second determined position, and/or the second determined velocity may be determined with respect to a moving coordinate system. For example, in certain embodiments, the first determined position and the first determined velocity of the harvester may be determined relative to the haul vehicle, thereby establishing a moving coordinate system having an origin at the haul vehicle. In further embodiments, the second determined position and the second determined velocity of the haul vehicle may be determined relative to the harvester, thereby establishing a moving coordinate system having an origin at the harvester.

Furthermore, while the control systems and methods are described herein with reference to an agricultural harvester and a mobile storage compartment (e.g., towed by a haul vehicle), it should be appreciated that the control systems and methods may be utilized for other agricultural and/or non-agricultural applications. For example, the alignment calibration process described herein may be utilized to facilitate automatic alignment of a harvester with a stationary storage compartment. In addition, the automatic control systems and methods described herein may be employed to automatically dock the mobile storage compartment with an on-road transport vehicle, such as a commercial truck, thereby facilitating efficient transfer of the agricultural product to the transport vehicle. Moreover, the automatic control systems and methods described herein may be utilized to automatically dock a haul vehicle (e.g., dump truck) with a mining vehicle, thereby enabling the mining vehicle to efficiency unload ore or other materials.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for an agricultural vehicle, comprising:
a controller configured to:
receive a first signal from a user interface indicative of alignment of a conveyor outlet of the agricultural vehicle with a first point on a storage compartment;
determine a first position of the storage compartment relative to the agricultural vehicle upon receiving the first signal;
receive a second signal from the user interface indicative of alignment of the conveyor outlet with a second point on the storage compartment, diagonally opposite the first point;
determine a second position of the storage compartment relative to the agricultural vehicle upon receiving the second signal;
establish a bounding rectangle having a first corner at the first point and a second corner at the second point based on the first position and the second position;
establish a target point within the bounding rectangle;
output a third signal indicative of a third position of the first corner of the bounding rectangle relative to the storage compartment, a fourth position of the second corner of the bounding rectangle relative to the storage compartment, and a fifth position of the target point relative to the storage compartment; and
control a product delivery system to engage product flow from the conveyor outlet to the storage compartment while the conveyor outlet is within the bounding rectangle or while the conveyor outlet is within a threshold range of the target point.

2. The control system of claim 1, wherein the controller is configured to receive a fourth signal indicative of an identity of the storage compartment, to associate the identity with the third, fourth, and fifth positions, and to store the identity and the third, fourth, and fifth positions for subsequent alignment of the conveyor outlet with the storage compartment.

3. The control system of claim 2, wherein the controller is configured to determine whether dimensions of the bounding rectangle are within a threshold range prior to storing the identity and the third, fourth, and fifth positions.

4. The control system of claim 2, wherein the controller is configured to determine whether the first position and the second position are within a threshold range prior to storing the identity and the third, fourth, and fifth positions.

5. The control system of claim 1, wherein the controller is configured to laterally adjust the fifth position of the target point, to longitudinally adjust the fifth position of the target point, or a combination thereof, based on a fifth signal.

6. The control system of claim 5, wherein the controller is configured to limit adjustment of the target point to locations within the bounding rectangle.

7. A control system for an agricultural vehicle, comprising:
a user interface configured to receive input from an operator of the agricultural vehicle; and
a controller communicatively coupled to the user interface, wherein the controller is configured to:
receive a first signal from the user interface indicative of alignment of a conveyor outlet of the agricultural vehicle with a first point on a storage compartment;
determine a first position of the storage compartment relative to the agricultural vehicle upon receiving the first signal;

receive a second signal from the user interface indicative of alignment of the conveyor outlet with a second point on the storage compartment, diagonally opposite the first point;

determine a second position of the storage compartment relative to the agricultural vehicle upon receiving the second signal;

establish a bounding rectangle having a first corner at the first point and a second corner at the second point based on the first position and the second position;

establish a target point within the bounding rectangle; and control a product delivery system to engage product flow from the conveyor outlet to the storage compartment while the conveyor outlet is within the bounding rectangle or while the conveyor outlet is within a threshold range of the target point.

8. The control system of claim 7, wherein the user interface comprises a display configured to provide a graphical representation of the first corner and the second corner of the bounding rectangle.

9. The control system of claim 7, wherein the user interface is configured to facilitate input of a lateral adjustment of the target point, a longitudinal adjustment of the target point, or a combination thereof.

10. The control system of claim 9, wherein the controller is configured to limit adjustment of the target point to locations within the bounding rectangle.

11. A method for calibrating alignment of a conveyor outlet of an agricultural vehicle with a storage compartment, comprising:

receiving, via a processor, a first signal from a user interface indicative of alignment of the conveyor outlet with a first point on the storage compartment;

determining, via the processor, a first position of the storage compartment relative to the agricultural vehicle upon receiving the first signal;

receiving, via the processor, a second signal from the user interface indicative of alignment of the conveyor outlet with a second point on the storage compartment, diagonally opposite the first point;

determining, via the processor, a second position of the storage compartment relative to the agricultural vehicle upon receiving the second signal;

establishing, via the processor, a bounding rectangle having a first corner at the first point and a second corner at the second point based on the first position and the second position;

establishing, via the processor, a target point within the bounding rectangle;

outputting, via the processor, a third signal indicative of a third position of the first corner of the bounding rectangle relative to the storage compartment, a fourth position of the second corner of the bounding rectangle relative to the storage compartment, and a fifth position of the target point relative to the storage compartment; and controlling, via the processor, a product delivery system to engage product flow from the conveyor outlet to the storage compartment while the conveyor outlet is within the bounding rectangle or while the conveyor outlet is within a threshold range of the target point.

12. The method of claim 11, comprising:

receiving, via the processor, a fourth signal indicative of an identity of the storage compartment;

associating, via the processor, the identity with the third, fourth, and fifth positions; and storing, via the processor and a memory, the identity and the third, fourth, and fifth positions for subsequent alignment of the conveyor outlet with the storage compartment.

13. The method of claim 12, comprising determining, via the processor, whether dimensions of the bounding rectangle are within a threshold range prior to storing the identity and the third, fourth, and fifth positions.

14. The method of claim 11, comprising laterally adjusting, via the processor, the fifth position of the target point, longitudinally adjusting, via the processor, the fifth position of the target point, or a combination thereof, based on a fifth signal.

15. The method of claim 11, comprising adjusting, via the processor, the first and second points and the first and second positions based on input from an optical sensor, a measuring device, or a combination thereof.

* * * * *